(12) United States Patent
Mercer et al.

(10) Patent No.: US 8,386,644 B1
(45) Date of Patent: Feb. 26, 2013

(54) SYSTEMS AND METHODS FOR EFFICIENTLY PROCESSING LARGE DATA SEGMENTS

(75) Inventors: Ronald M. Mercer, Huntington Beach, CA (US); Shashank Pandhare, Pune (IN)

(73) Assignee: Qlogic, Corporation, Aliso Viejo, CA (US)

( * ) Notice: Subject to any disclaimer, the term of this patent is extended or adjusted under 35 U.S.C. 154(b) by 394 days.

(21) Appl. No.: 12/901,994

(22) Filed: Oct. 11, 2010

(51) Int. Cl.
*G06F 15/16* (2006.01)
(52) U.S. Cl. ......... 709/245; 709/203; 709/238; 370/394
(58) Field of Classification Search .................. 709/203, 709/238, 245; 370/394, 412, 413, 463; 711/208; 719/319, 321
See application file for complete search history.

(56) References Cited

U.S. PATENT DOCUMENTS

| | | | |
|---|---|---|---|
| 5,396,490 A | 3/1995 | White et al. | |
| 5,440,545 A | 8/1995 | Buchholz et al. | |
| 6,212,593 B1 | 4/2001 | Pham et al. | |
| 6,370,583 B1* | 4/2002 | Fishler et al. ................ | 709/238 |
| 6,631,422 B1 | 10/2003 | Althaus et al. | |
| 7,076,545 B2 | 7/2006 | DiMambro | |
| 2005/0129040 A1* | 6/2005 | Kiel et al. ................. | 370/412 |
| 2005/0213603 A1* | 9/2005 | Karighattam et al. ........ | 370/463 |
| 2009/0019196 A1 | 1/2009 | Chew et al. | |
| 2009/0183057 A1* | 7/2009 | Aizman ....................... | 714/807 |

FOREIGN PATENT DOCUMENTS

WO WO-2007/074343 7/2007

* cited by examiner

*Primary Examiner* — Frantz Jean
(74) *Attorney, Agent, or Firm* — Klein, O'Neill & Singh, LLP

(57) ABSTRACT

Large data segments are efficiently processed by setting up a plurality of Large Receive Segment Offload (LRO) queues within the computing system memory. The plurality of LRO queues are maintained concurrently so that a plurality of LRO contexts can be assembled simultaneously. A timer associated with each LRO queue prevents indefinite waiting for LRO segments to be completed.

18 Claims, 4 Drawing Sheets

SYSTEMS AND METHODS FOR EFFICIENTLY PROCESSING LARGE DATA SEGMENTS

TECHNICAL FIELD

The present invention relates to computing systems.

Background

Computing systems typically use an adapter to communicate with other devices in a network. The adapter receives information (or packets/frames) from the network via one or more network connections and passes it to the computing system (sometimes referred to as a host system). The adapter also receives information from the computing system and then sends it to the network. The computing system may maintain multiple simultaneous connections with other computing systems, or peers, to send and receive information.

Typical network traffic is segmented into packets of a predetermined size, where packet size varies from one protocol to another. When packets are received by the adapter from the network, they are first temporarily stored at the adapter and then sent to the computing system and stored in host memory. Typically, the computing system passes memory pointers associated with storage locations (or memory buffers) in host memory to the adapter so that the received packets can be stored at the proper locations.

The computing system passes the memory pointers in a given order. As packets are received, the adapter stores them in memory buffers and notifies the computing system where the packets are stored. Each notification, however, typically includes only the physical memory address where a given packet is stored. If the adapter does not pass the buffers back to the host in the same order in which they were passed to the adapter, the computing system has to search through a buffer control block list in order to find the control blocks that match the physical addresses. The buffer control block list is an array that indicates which control block corresponds to which buffer. As the computing system locates buffers in the list, it can then determine which control blocks corresponds to those buffers. The computing system can then access the buffers having the given physical addresses so that the packets can be read out of the buffers. This process is inefficient, because host processor resources are used to search through the buffer control block list.

Further, each packet received at the adapter may cause a computing system interrupt so that the packet can be processed by a device driver of the computing system and a host network stack. Many packets, however, are merely sub-segments of larger segments. Thus, it can be inefficient to generate an interrupt for each packet, as each interrupt generated creates additional overhead for the host CPU.

Large Receive Segment Offload (LRO) is a method of gathering together these sub-segments and presenting them as a single entity to a network stack executed by the host system. The host network stack thus does not have to process each segment individually, thereby reducing overhead for the host CPU. As used herein, the term "large segment" refers to a segment whose size is large enough to prevent the entire segment from being stored in a single memory buffer.

In one typical implementation of LRO, when consecutive packets are received from a single context those packets are placed in consecutive buffers, but the adapter does not immediately generate a computing system interrupt. Instead, the adapter holds the interrupt until either the last packet of the context is received or a packet from a different context is received. As used herein, a context relates to a single peer-to-peer connection and describes a sequence of packets received from that connection to be linked together for presentation to the host system as a single entity.

The foregoing LRO implementation is illustrated in FIG. 1, which illustrates a plurality of buffers 100. A first packet is received from context A and placed into buffer 0. A second packet is received from context B and placed into buffer 1. At this point the adapter generates an interrupt so that the computing system can process the first packet. A third packet is then received from context B and placed into buffer 2. Because the third packet is from the same context as the second packet, the adapter holds the interrupt. In fact, the adapter continues holding the interrupt as fourth and fifth packets are received from context B and placed into buffers 3 and 4. Next, a sixth packet is received from context C. At this point the adapter generates an interrupt so that the computing system can process the packets in buffers 1-4.

In the foregoing implementation, the computing system advantageously receives the buffers in the same order in which they were passed to the adapter. However, this implementation typically generates a considerable number of interrupts, because the computing system typically receives packets from multiple contexts in rapid succession.

In another typical implementation of LRO, illustrated in FIG. 2, the adapter receives packets from multiple contexts and stores them in buffers without regard to whether consecutive buffers contain packets from the same context. The adapter continues receiving and storing packets until a last packet of a given context is received. In FIG. 2, for example, the adapter continues to receive packets from contexts A, B and C, and places them into buffers in the order in which they were received. When the last packet of the sequence from context A is received, the adapter generates an interrupt for that sequence. The computing system then processes the packets from context A, which are located in buffers 0, 6 and 8. As illustrated, the packets are spread over several nonconsecutive buffers. The adapter thus passes the buffers back to the host system in an order different from the order in which they were passed to the adapter. The computing system thus has to search through a buffer control block list in order to find the control block that matches the physical addresses for the returned buffers. As explained above, this process is inefficient. Continuous efforts are being made to improve processing of large data segments.

SUMMARY

The various embodiments of the present systems and methods for efficiently processing large data segments have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One of the present embodiments comprises a machine-implemented method for processing large data segments received by a computing system. The computing system has a plurality of memory buffers and interfaces with an adapter for enabling the computing system to interface with another networked device. The method comprises a processor-executable driver of the computing system setting up a plurality of large-segment queues, each large-segment queue including a portion of the memory buffers. The method further comprises the adapter receiving a first packet from a first context. The first context relates to a first connection between the computing system and a first one of the other networked devices and describes a sequence of packets received from the first connection to be linked together for presentation to the computing system as a single entity. The method further comprises the adapter determining that the first context is assigned to a first one of the queues, and the adapter copying the first packet to the first queue. The method further comprises the adapter receiving a second packet from a second context. The second context relates to a second connection between the computing system and a second one of the other networked devices and describes a sequence of packets received from the second connection to be linked together for presentation to the computing system as a single entity. The method further comprises the adapter determining that the second context is assigned to a second one of the queues, and the adapter copying the second packet to the second queue without generating a computing system interrupt for the first queue.

Another of the present embodiments comprises a machine-implemented method for processing large data segments received by a computing system. The computing system has a plurality of memory buffers and interfaces with an adapter for enabling the computing system to interface with another networked device. The method comprises a processor-executable driver of the computing system setting up a plurality of large-segment queues, each large-segment queue including a portion of the memory buffers. The method further comprises the adapter receiving a first packet from a first context. The first context relates to a first connection between the computing system and a first one of the other networked devices and describes a sequence of packets received from the first connection to be linked together for presentation to the computing system as a single entity. The method further comprises the adapter determining that a context of the first packet is assigned to a first one of the queues, and the adapter copying the packet to the first queue. The method further comprises the adapter starting a timer associated with the first queue. The method further comprises the adapter receiving additional packets from the first context and copying the additional packets to the first queue. The method further comprises the adapter determining that the timer has expired. The method further comprises the adapter generating a computing system interrupt for processing the packets stored in the first queue.

Another of the present embodiments comprises a machine-implemented method for processing large data segments received by a computing system. The computing system has a plurality of memory buffers and interfaces with an adapter for enabling the computing system to interface with another networked device. The method comprises a processor-executable driver of the computing system setting up a plurality of large-segment queues, each large-segment queue including a portion of the memory buffers. The method further comprises the adapter receiving a first packet from a first context. The first context relates to a first connection between the computing system and a first one of the other networked devices and describes a sequence of packets received from the first connection to be linked together for presentation to the computing system as a single entity. The method further comprises the adapter determining that a context of the first packet is assigned to a first one of the queues, and the adapter copying the packet to the first queue. The method further comprises the adapter determining that the first packet is the last portion of a packet sequence associated with the first context. The method further comprises the adapter generating a computing system interrupt for processing the packets stored in the first queue. The method further comprises the adapter terminating the first context and reassigning a portion of the memory buffers to the first queue. The method further comprises the adapter designating the first queue as free to be reassigned to a new context.

BRIEF DESCRIPTION OF THE DRAWINGS

The various embodiments of the present systems and methods for efficiently processing large data segments now will be discussed in detail with an emphasis on highlighting the advantageous features. These embodiments depict the novel and non-obvious systems and methods shown in the accompanying drawings, which are for illustrative purposes only. These drawings include the following figures, in which like numerals indicate like parts.

DETAILED DESCRIPTION

Figure 1:
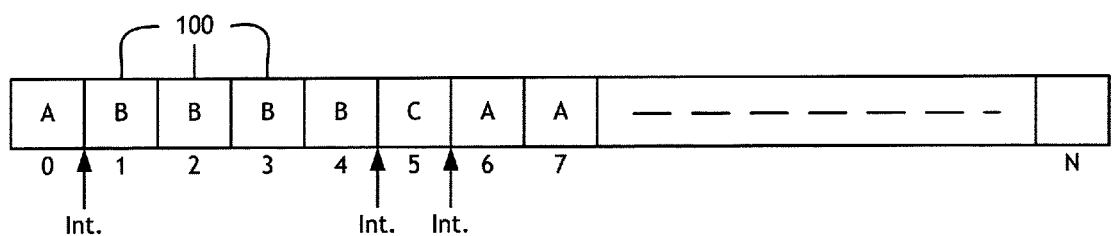
FIG. 1 is a functional block diagram of a buffer queue, illustrating one implementation of prior art Large Receive Segment Offload (LRO) processing.
Figure 2:
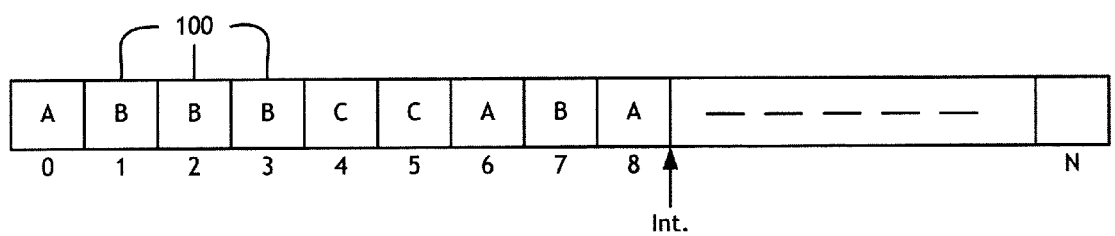
FIG. 2 is a functional block diagram of a buffer queue, illustrating another implementation of prior art LRO processing.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of medium for retaining information in any form, including various kinds of storage devices (magnetic, optical, static, flash, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Figure 3:
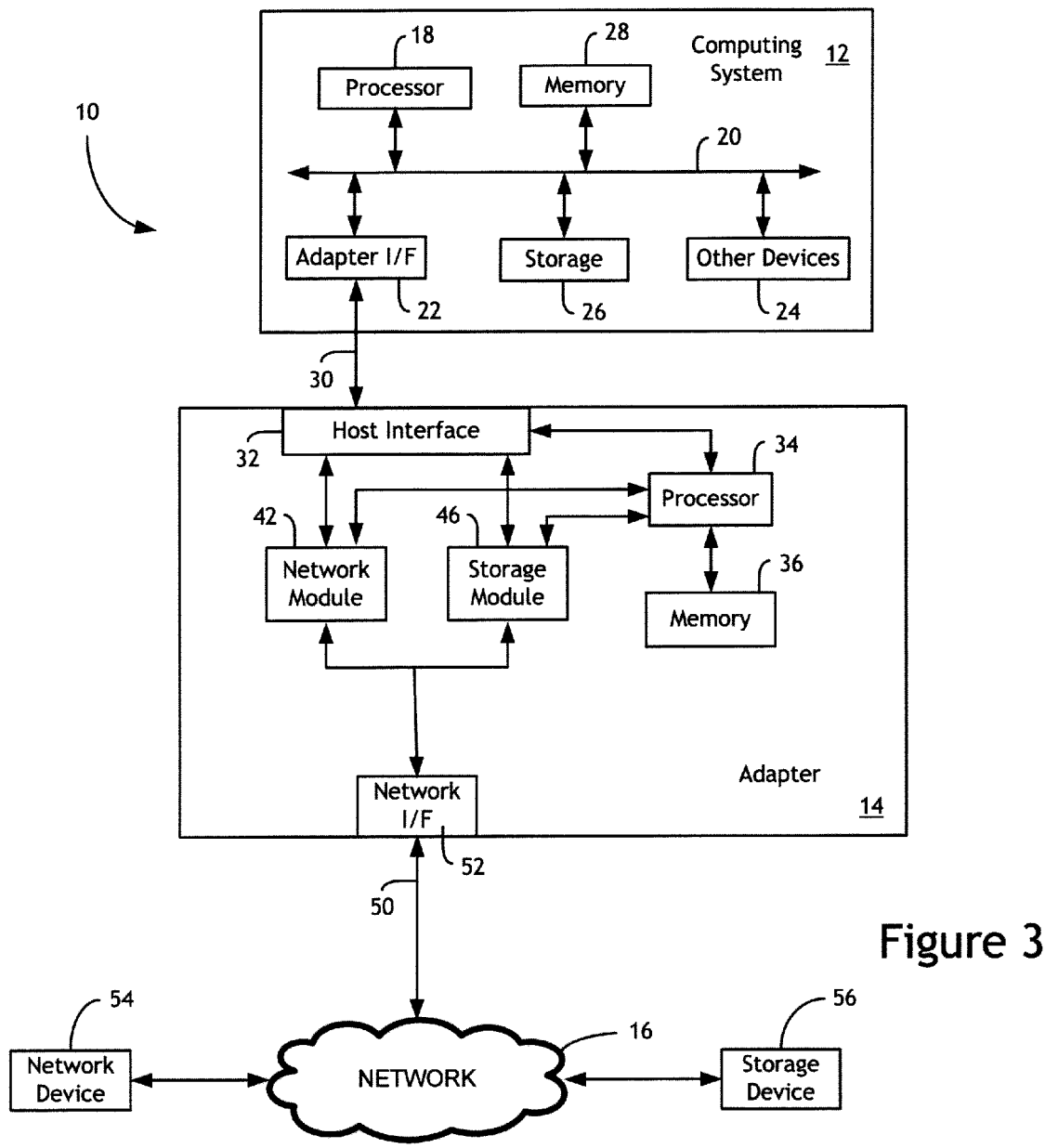
FIG. 3 is a functional block diagram of a computing system configured to interface with a network of devices via an adapter.

FIG. 3 is a block diagram of a system 10 configured for use with the present embodiments. The system 10 includes a computing system 12 (may also be referred to as "host system 12") coupled to an adapter 14 that interfaces with a network 16. The network 16 may include, for example, additional computing systems, servers, storage systems, etc. The computing system 12 may include one or more processors 18, also known as a central processing unit (CPU). The processor 18 executes computer-executable process steps and interfaces with a computer bus 20. An adapter interface 22 facilitates the ability of the computing system 12 to interface with the adapter 14, as described below. The computing system 12 also includes other devices and interfaces 24, which may include a display device interface, a keyboard interface, a pointing device interface, etc.

The computing system 12 may further include a storage device 26, which may be for example a hard disk, a CD-ROM, a non-volatile memory device (flash or memory stick) or any other device. Storage 26 may store operating system program files, application program files, and other files. Some of these files are stored on storage 26 using an installation program. For example, the processor 18 may execute computer-executable process steps of an installation program so that the processor 18 can properly execute the application program.

Memory 28 also interfaces to the computer bus 20 to provide the processor 18 with access to memory storage. Memory 28 may include random access main memory (RAM). When executing stored computer-executable process steps from storage 26, the processor 18 may store and execute the process steps out of RAM. Read only memory (ROM, not shown) may also be used to store invariant instruction sequences, such as start-up instruction sequences or basic input/output operating system (BIOS) sequences for operation of a keyboard (not shown).

With continued reference to FIG. 3, a link 30 and the adapter interface 22 couple the adapter 14 to the computing system 12. The adapter 14 may be configured to handle both network and storage traffic. Various network and storage protocols may be used to handle network and storage traffic. Some common protocols are described below.

One common network protocol is Ethernet. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 Gbps. The descriptions of the various embodiments described herein are based on using Ethernet (which includes 100 Base-T and/or Gigabit Ethernet) as the network protocol. However, the adaptive embodiments disclosed herein are not limited to any particular protocol, as long as the functional goals are met by an existing or new network protocol.

One common storage protocol used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via host bus adapters) to a fabric, which are then connected to multiple devices. The Fibre Channel fabric topology allows several media types to be interconnected.

Fibre Channel fabric devices include a node port or "N_Port" that manages Fabric connections. The N_port establishes a connection to a Fabric element (e.g., a switch) having a fabric port or F_port.

A new and upcoming standard, called Fibre Channel Over Ethernet (FCOE) has been developed to handle both Ethernet and Fibre Channel traffic in a storage area network (SAN). This functionality would allow Fibre Channel to leverage 10 Gigabit Ethernet networks while preserving the Fibre Channel protocol. The adapter 14 shown in FIG. 3 may be configured to operate as an FCOE adapter and may be referred to as FCOE adapter 14. QLogic Corporation, the assignee of the present application, provides one such adapter. The illustrated adapter 14, however, does not limit the scope of the present embodiments. The present embodiments may be practiced with adapters having different configurations.

The adapter 14 interfaces with the computing system 12 via the link 30 and a host interface 32. In one embodiment, the host interface 32 may be a PCI Express interface coupled to a PCI Express link. The adapter 14 may also include a processor 34 that executes firmware instructions out of memory 36 to control overall adapter 14 operations.

The adapter 14 includes a network module 42 for handling network traffic via a link 50. In one embodiment, the network module 42 includes logic and circuitry for handling network packets, for example, Ethernet or any other type of network packets. The network module 42 may include memory buffers (not shown) to temporarily store information received from other network devices 54 and transmitted to other network devices 54. In one embodiment, the network module 42 may operate according to the Ethernet network protocol, or any other protocol.

The adapter 14 may also include a storage module 46 for handling storage traffic to and from storage devices 56. The storage module 46 may further include memory buffers (not shown) to temporarily store information received from the storage devices 56 and transmitted by the adapter 14 to the storage devices 56. In one embodiment, the storage module 46 is configured to process storage traffic according to the Fibre Channel storage protocol, or any other protocol.

The adapter 14 also includes a network interface 52 that interfaces with the link 50 via one or more ports (not shown). The network interface 52 includes logic and circuitry to receive information via the link 52 and pass it to either the network module 42 or the storage module 46.

Figure 4:
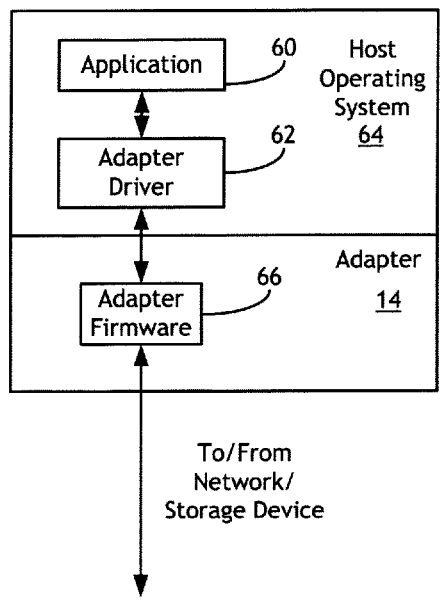
FIG. 4 is a functional block diagram of an architecture for a computing system and an adapter interfacing with a network of devices.

FIG. 4 illustrates one example of an architecture for the system 10 of FIG. 3. The architecture includes an application 60 and an adapter driver 62 that are executed within the context of a host operating system 64. With reference to FIG. 3, the application 60 and the adapter driver 62 may be executed by the processor 18 out of the memory 28. With reference to FIG. 4, the architecture further includes adapter firmware 66 that is executed by the adapter 14. With reference to FIG. 3, the adapter firmware 66 may be executed by the processor 34 out of the memory 36.

As discussed above, current implementations of Large Receive Segment Offload (LRO) generate inefficiencies, either because considerable interrupts are generated, or because buffers are returned to the host computing system in an order different from the order in which they were passed to the adapter. The present embodiments address these problems by creating a plurality of LRO queues, where each queue temporarily stores received packets and is associated with a unique context. This implementation enables the adapter firmware 66 to switch over to a new context to which it can start queuing packets whenever a packet from a new sequence is received. As indicated above, a context relates to a single peer-to-peer connection and describes a sequence of packets received from that connection to be linked together for presentation to the computing system 12 as a single entity. In the present embodiments, and as described further below, each context is locked to a given LRO queue until certain conditions happen, such as a sequence is completed or a timeout occurs. While the LRO queue is locked to its associated context, packets received from other contexts cannot be copied to that queue. Further, an interrupt is only generated for that queue when the sequence completes or a timeout occurs. The present embodiments thus increase efficiency by reducing the frequency with which interrupts are generated. Further, as packets are received they are stored in consecutive buffers within their respective LRO queues. Thus, as each sequence completes it is passed up to the computing system 12 with the buffers in the same order in which they were passed to the adapter 14. The present embodiments thus further increase efficiency by eliminating the need for the computing system 12 to search a buffer control block list in order to locate buffers passed back by the adapter 14.

Figure 5:
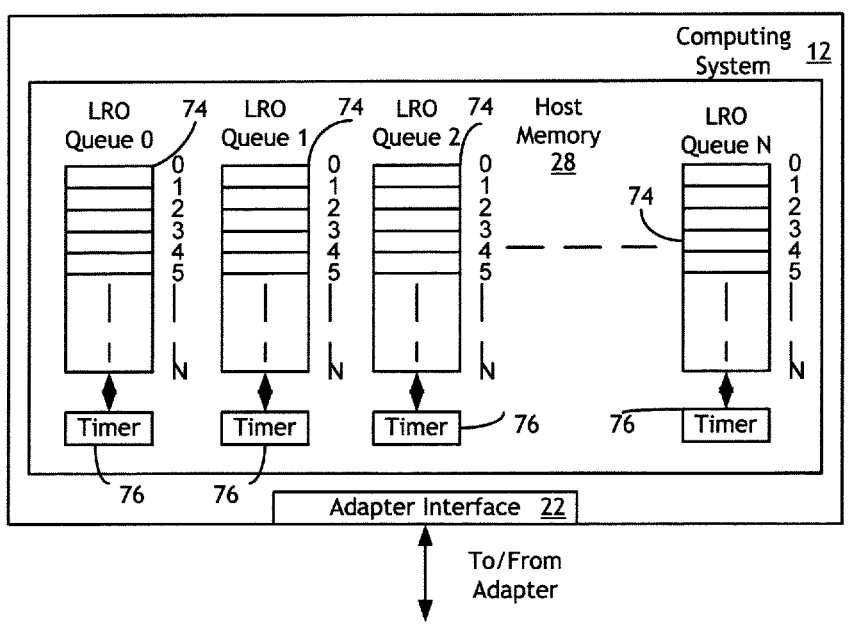
FIG. 5 is a functional block diagram of a computing system memory including a plurality of large-segment queues according to one of the present embodiments.

FIG. 5 illustrates a computing system 12 having a memory 28 including a plurality of LRO queues 74 according to one of the present embodiments. A queue in this context may be dedicated to a single connection or context. The queue may include or is associated with one or more memory storage locations or buffers to store packets received from a network. As explained in further detail below, the plurality of LRO queues 74 can be maintained concurrently so that a plurality of LRO contexts can be assembled simultaneously. Further, only a single interrupt is generated for each receive queue 74 as each LRO sequence is completed, rather than one interrupt per sub-sequence.

Currently, some network adapters may use multiple receive queues to direct different types of traffic, such as unicast, multicast, broadcast, VLAN, etc., to different receive queues for specific and optimized driver processing. The present embodiments add a new type of receive queue 74 that is reserved for processing LRO contexts. In one embodiment, the adapter 14 can lock up a given LRO queue 74 for a single sequence until conditions cause the sequence to complete. At that point, the adapter 14 updates any network protocol header information and generates an interrupt for that queue 74. With this method, the adapter driver 62 can determine how many simultaneous LRO sequences can be outstanding on the adapter 14 by varying the number of LRO receive queues 74.

With further reference to FIG. 5, N LRO queues 74 are shown, where N may represent any number. Further, the number of active LRO queues 74 may change as network traffic conditions change. As packets from new contexts are received at the adapter 14, a new LRO queue 74 may be added for each new context. Received packets are stored in consecutive buffers within their associated LRO queue 74. As each queue 74 is completed, the adapter 14 links together the packets stored in that queue 74 and passes the data up the network stack as a single entity. The context is then terminated. The adapter driver 62 then assigns new buffers to the queue 74, and the queue 74 is set as "free," meaning that it can be used for a new incoming context.

In certain embodiments, a context may be terminated in response to receipt of a sequence termination frame by the adapter 14. A sequence termination frame may, for example, include a flag in its header indicating that it is the last frame in a sequence. When such a frame is received by the adapter 14, it is stored within its associated LRO queue 74. The adapter 14 then links together the packets stored in that queue 74, and passes the data up the network stack as a single entity. That context is then terminated.

In certain other embodiments, a protocol may determine a maximum size of each packet. In such embodiments, receipt of a packet by the adapter 14 that is smaller than the maximum packet size may trigger a context termination and interrupt. Thus, when a packet that is smaller than the maximum packet size is received by the adapter 14, it is stored within its associated LRO queue 74. The adapter 14 then links together the packets stored in that queue 74, and passes the data up the network stack as a single entity. That context is then terminated.

FIG. 5 further illustrates that each LRO queue 74 has length N, where N may represent any number. As each LRO queue 74 is created, the adapter driver 62 determines the amount of memory assigned to the queue 74. This process may happen during initialization or at a later point during the course of operation.

With further reference to FIG. 5, a timer 76 is associated with each LRO queue 74. Each timer 76 begins running when a first packet of a new context is copied to the associated queue 74. If the timer 76 expires before the sequence in that queue 74 is completed, the adapter 14 generates an interrupt for processing the received portion of the sequence. In this manner, the timer 76 prevents its corresponding LRO queue 74 from being locked up for an excessive amount of time.

Figure 6:
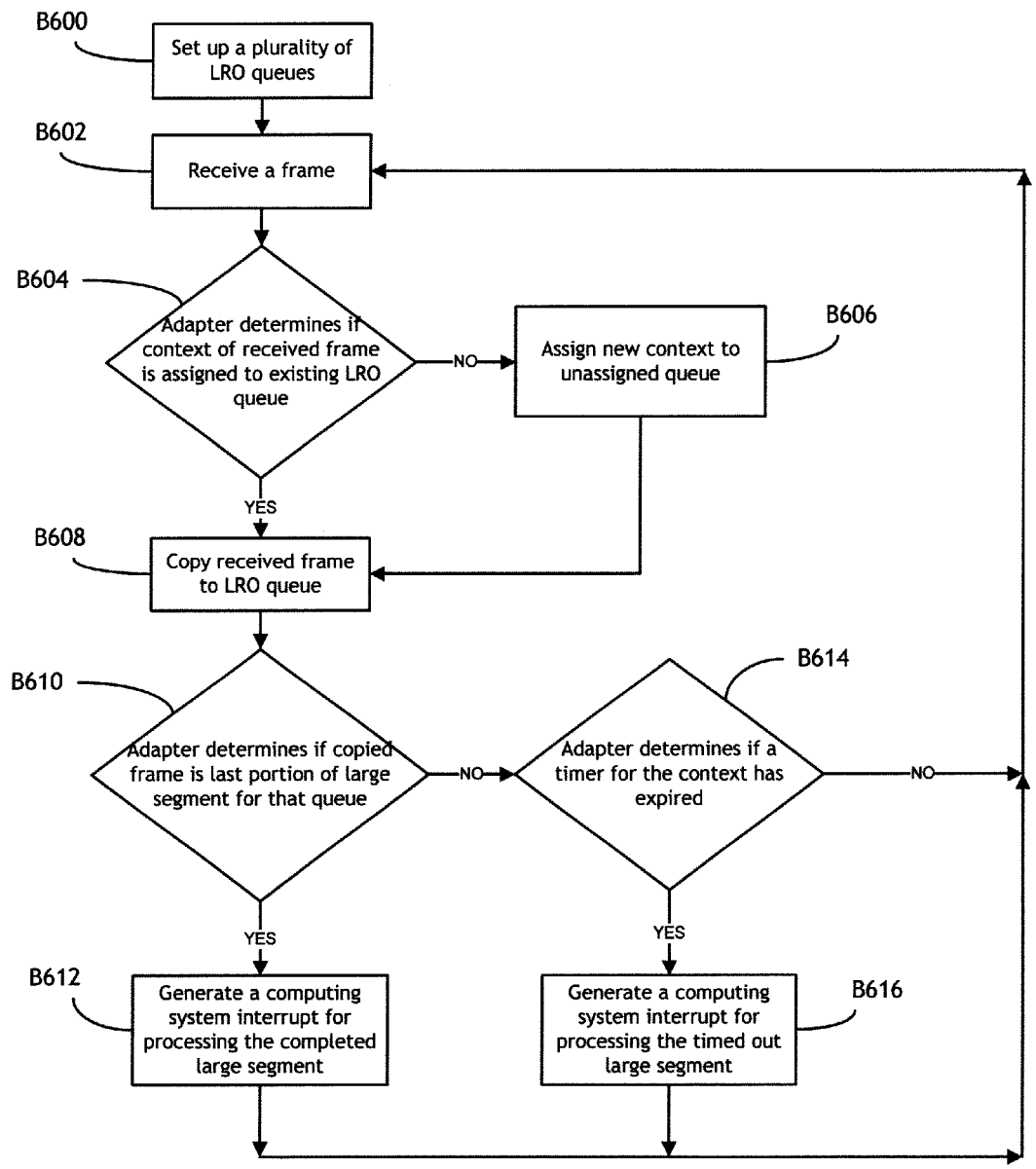
FIG. 6 is a block diagram of a process flow according to one of the present embodiments.

FIG. 6 illustrates a process flow according to one embodiment of the present methods for processing incoming LRO packets. The process begins at block B600 when the adapter driver 62 of the computing system 12 sets up a plurality of LRO queues 74 in the computing system memory 28. This step may occur at driver initialization. The driver 62 determines how many LRO queues 74 it wants, allocates the queues 74 and buffers for the queues 74, and passes the queues 74 to the adapter 14 with flags set to indicate the queues 74 are for LRO only. The buffer count and buffer size made available in each LRO queue 74 determines the maximum size of any given LRO sequence.

The process continues at block B602, where the adapter 14 receives a packet. At block B604, the adapter 14 determines if the context of the received packet is assigned to an existing LRO queue 74. If the answer is no, then at block B606 the adapter 14 assigns a new context to an unassigned LRO queue 74. The process then proceeds to block B608 where the packet is copied to the queue 74 to which the context of the received packet is assigned. If, however, the answer is yes, then the process proceeds directly to block B608.

After a packet is copied to its assigned queue 74, at block B610 the adapter 14 determines if the copied packet is the last portion of an LRO segment for that queue 74. If the answer is yes, then the LRO segment is complete and at block B612 the adapter 14 generates a computing system interrupt for processing the completed segment. After block B612, the process returns to block B602 for processing further received packets.

If at block B610 the adapter 14 determines that the copied packet is not the last portion of an LRO segment for that queue 74, then at block B614 the adapter 14 determines if a timer 76 for that context has expired. If the answer is yes, then at block B616 the adapter 14 generates a computing system interrupt for processing the timed out large segment. The timer 76 thus prevents the method from waiting indefinitely for LRO segments to be completed. After block B616 the process returns to block B602 for processing further received packets. In addition, if at block B614 the adapter 14 determines that the timer 76 for that context has not expired, then the process returns to block B602 for processing further received packets.

The present embodiments achieve significant advantages over previous implementations of LRO. For example, the present embodiments create a plurality of unique LRO queues that exist simultaneously. Received packets are copied to the queues associated with their respective contexts. Interrupts are generated only when the sequence in each queue completes or is timed out. The present embodiments thus reduce the frequency of interrupts, which reduces the burden on host CPU resources. Further, received packets are copied to consecutive buffers in their respective LRO queues. Thus, when a completed sequence is passed to the computing system the buffers are returned in the same order in which they were passed to the adapter. The present embodiments thus further reduce the burden on host CPU resources by eliminating the need for the computing system to search a buffer control block list in order to locate buffers passed back by the adapter.

The above description presents the best mode contemplated for carrying out the present systems and methods for efficiently processing large data segments, and of the manner and process of practicing them, in such full, clear, concise, and exact terms as to enable any person skilled in the art to which they pertain to practice these systems and methods. These systems and methods are, however, susceptible to modifications and alternate constructions from those discussed above that are fully equivalent. Consequently, these systems and methods are not limited to the particular embodiments disclosed. On the contrary, these systems and methods cover all modifications and alternate constructions coming within the spirit and scope of the systems and methods as generally expressed by the following claims, which particularly point out and distinctly claim the subject matter of the systems and methods.

What is claimed is:

1. A machine-implemented method for processing large data segments received by a computing system, the computing system having a plurality of memory buffers and interfacing with an adapter for enabling the computing system to interface with a networked device, the method comprising:
   a processor-executable driver of the computing system setting up a plurality of large-segment queues, each large-segment queue including a portion of the memory buffers;
   the adapter receiving a first packet from a first context, wherein the first context relates to a first connection between the computing system and a first one of the other networked devices and describes a sequence of packets received from the first connection to be linked together for presentation to the computing system as a single entity;
   the adapter determining that the first context is assigned to a first one of the queues, and the adapter copying the first packet to the first queue;
   the adapter receiving a second packet from a second context, wherein the second context relates to a second connection between the computing system and a second one of the other networked devices and describes a sequence of packets received from the second connection to be linked together for presentation to the computing system as a single entity; and
   the adapter determining that the second context is assigned to a second one of the queues, and the adapter copying the second packet to the second queue without generating a computing system interrupt for the first queue.

2. The method of claim 1, further comprising the adapter determining that the second packet is the last portion of a packet sequence associated with the second context, and the adapter generating a computing system interrupt for processing packets stored in the second queue.

3. The method of claim 1, further comprising:
   the adapter receiving a third packet from a third context, wherein the third context relates to a third connection between the computing system and a third one of the other networked devices and describes a sequence of packets received from the third connection to be linked together for presentation to the computing system as a single entity;
   the adapter determining that the third context is not assigned to any of the queues;
   the adapter assigning the third context to one of the queues that is designated as free; and
   the adapter copying the third packet to the third queue without generating a computing system interrupt for either the first queue or the second queue.

4. The method of claim 1, further comprising the computing system passing the plurality of large-segment queues to the adapter with flags set to indicate that the queues are designated for Large Receive Segment Offload only.

5. The method of claim 1, further comprising the adapter starting a timer associated with the first queue when the first packet is copied to the first queue.

6. The method of claim 5, further comprising the adapter determining whether the timer has expired each time the adapter receives additional packets from the first context.

7. The method of claim 6, further comprising the adapter determining that the timer has expired and generating a computing system interrupt for processing the packets stored in the first queue.

8. A machine-implemented method for processing large data segments received by a computing system, the computing system having a plurality of memory buffers and interfacing with an adapter for enabling the computing system to interface with a networked device, the method comprising:
   a processor-executable driver of the computing system setting up a plurality of large-segment queues, each large-segment queue including a portion of the memory buffers;
   the adapter receiving a first packet from a first context, wherein the first context relates to a first connection between the computing system and a first one of the other networked devices and describes a sequence of packets received from the first connection to be linked together for presentation to the computing system as a single entity;
   the adapter determining that a context of the first packet is assigned to a first one of the queues, and the adapter copying the packet to the first queue;
   the adapter starting a timer associated with the first queue;
   the adapter receiving additional packets from the first context and copying the additional packets to the first queue;

the adapter determining that the timer has expired; and the adapter generating a computing system interrupt for processing the packets stored in the first queue.

9. The method of claim 8, further comprising the computing system passing the plurality of large-segment queues to the adapter with flags set to indicate that the queues are designated for Large Receive Segment Offload only.

10. The method of claim 9, wherein when the packets stored in the first queue are processed the buffers in the first queue are passed to the computing system in the same order in which they were passed to the adapter.

11. The method of claim 8, further comprising locking the first queue to the first context so that packets from other contexts cannot be copied to the first queue.

12. The method of claim 8, further comprising the adapter terminating the first context, reassigning a portion of the memory buffers to the first queue, and designating the first queue as free to be reassigned to a new context.

13. A machine-implemented method for efficiently processing large data segments received by a computing system, the computing system having a plurality of memory buffers and interfacing with an adapter for enabling the computing system to interface with a networked device, the method comprising:

a processor-executable driver of the computing system setting up a plurality of large-segment queues, each large-segment queue including a portion of the memory buffers;

the adapter receiving a first packet from a first context, wherein the first context relates to a first connection between the computing system and a first one of the other networked devices and describes a sequence of packets received from the first connection to be linked together for presentation to the computing system as a single entity;

the adapter determining that a context of the first packet is assigned to a first one of the queues, and the adapter copying the packet to the first queue;

the adapter determining that the first packet is the last portion of a packet sequence associated with the first context;

the adapter generating a computing system interrupt for processing the packets stored in the first queue;

the adapter terminating the first context and reassigning a portion of the memo buffers to the first queue; and the adapter designating the first queue as free to be reassigned to a new context.

14. The method of claim 13, further comprising the computing system passing the plurality of large-segment queues to the adapter with flags set to indicate that the queues are designated for Large Receive Segment Offload only.

15. The method of claim 13, further comprising:

the adapter receiving a second packet from a second context, wherein the second context relates to a second connection between the computing system and a second one of the other networked devices and describes a sequence of packets received from the second connection to be linked together for presentation to the computing system as a single entity;

the adapter determining that a context of the second packet is assigned to a second one of the queues; and the adapter copying the packet to the second queue.

16. The method of claim 15, further comprising the adapter starting a timer associated with the second queue when the second packet is copied to the second queue.

17. The method of claim 16, further comprising the adapter determining whether the timer has expired each time the adapter receives additional packets from the second context.

18. The method of claim 17, further comprising the adapter determining that the timer has expired and generating a computing system interrupt for processing the packets stored in the second queue.

* * * * *

UNITED STATES PATENT AND TRADEMARK OFFICE
CERTIFICATE OF CORRECTION

| | |
|---|---|
| PATENT NO. | : 8,386,644 B1 |
| APPLICATION NO. | : 12/901994 |
| DATED | : February 26, 2013 |
| INVENTOR(S) | : Ronald M. Mercer et al. |

It is certified that error appears in the above-identified patent and that said Letters Patent is hereby corrected as shown below:

In the Claims:

In column 12, line 7, in Claim 13, delete "memo" and insert -- memory --, therefor.

Signed and Sealed this
Thirteenth Day of August, 2013

Teresa Stanek Rea
*Acting Director of the United States Patent and Trademark Office*